Jan. 14, 1936.                W. A. CROSSLEY                2,027,960
                        LANDING GEAR FOR AEROPLANES
                         Filed Aug. 15, 1934         3 Sheets-Sheet 1
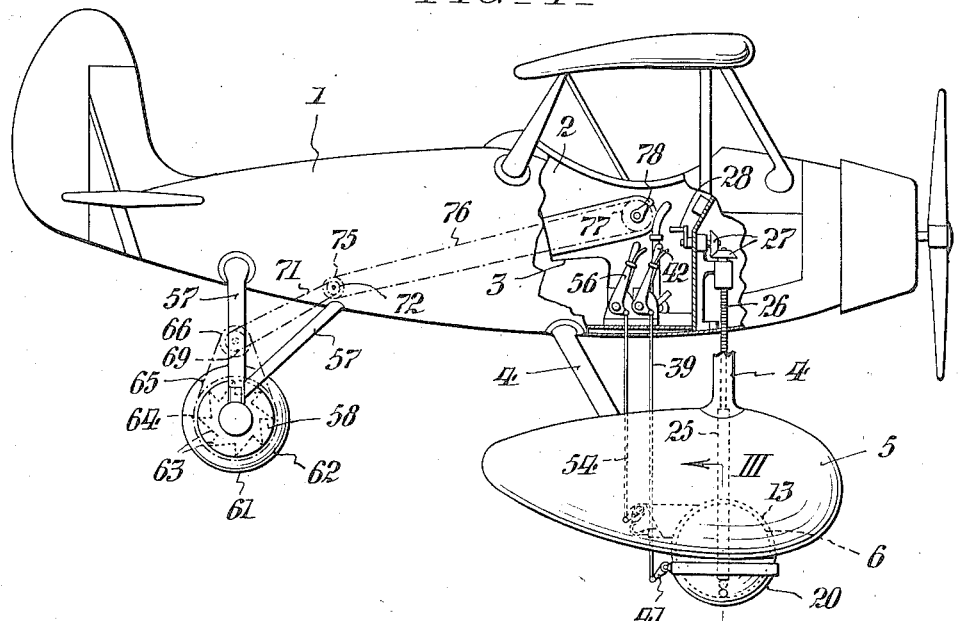
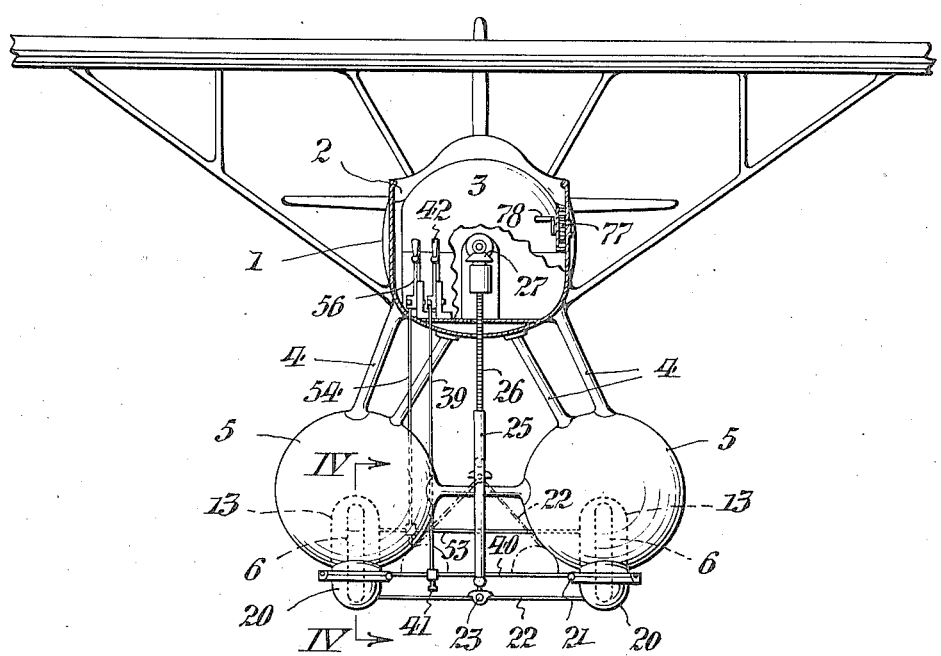

Jan. 14, 1936.  W. A. CROSSLEY  2,027,960
LANDING GEAR FOR AEROPLANES
Filed Aug. 15, 1934  3 Sheets-Sheet 2
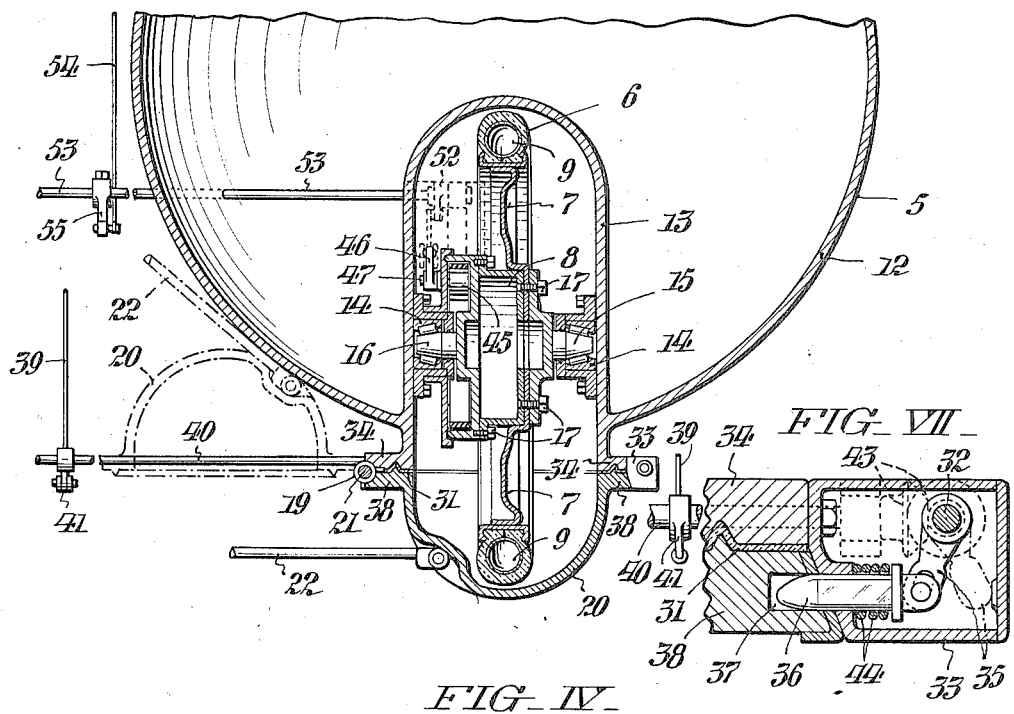
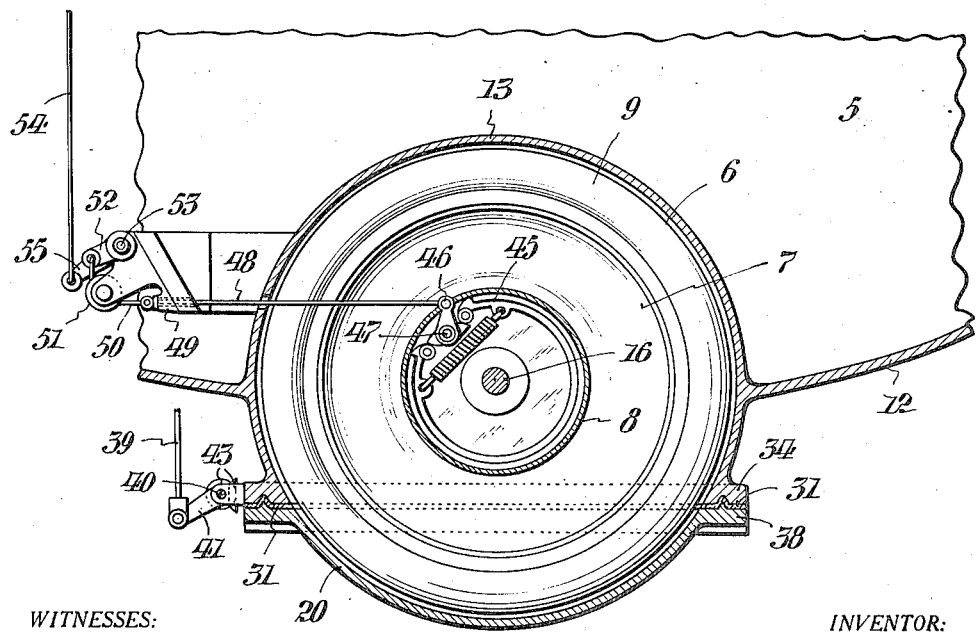
WITNESSES:
Hubert Fuchs
William Bell, Jr.
INVENTOR:
William A. Crossley,
BY Frailey Paul
ATTORNEYS.

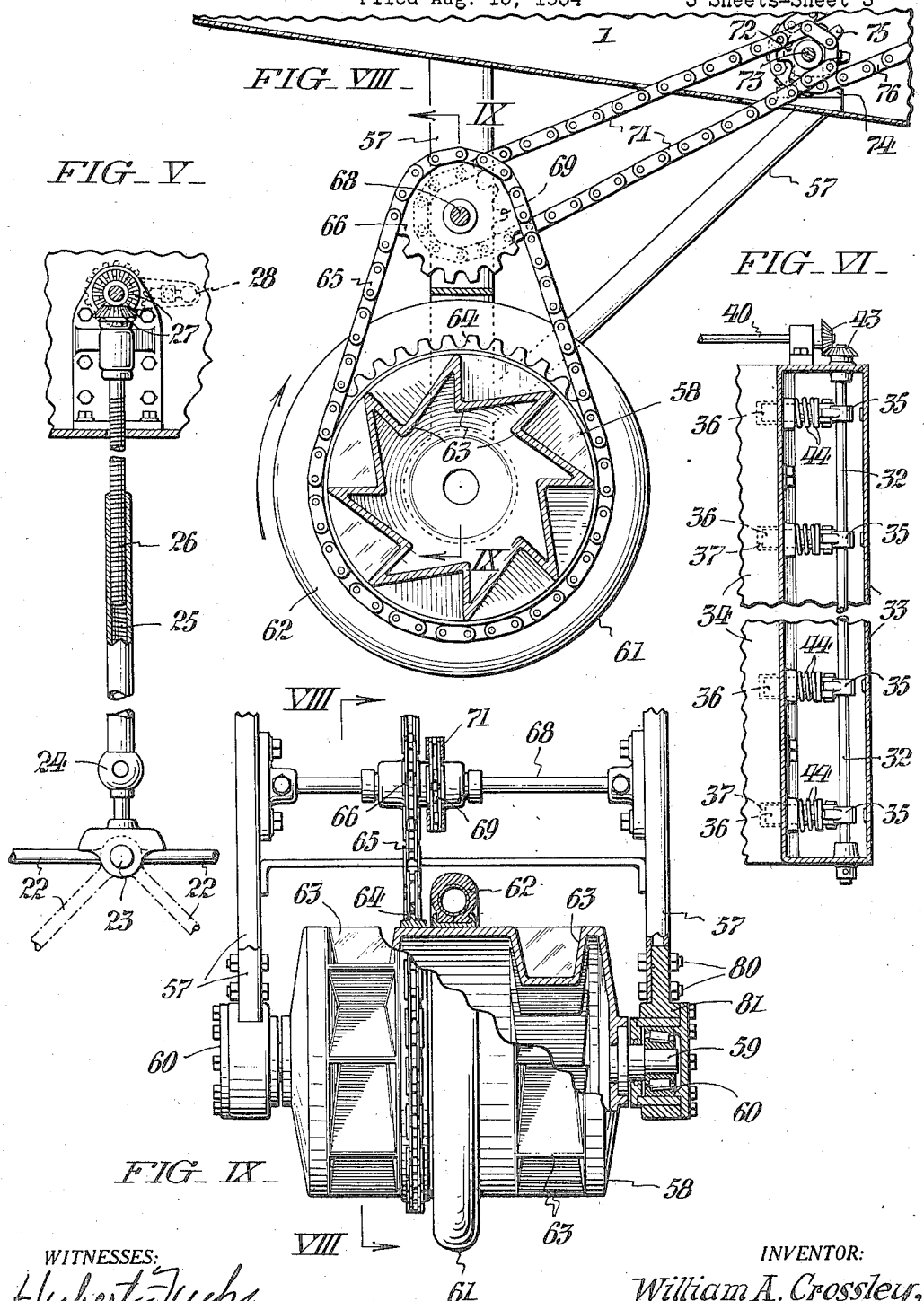

Patented Jan. 14, 1936

2,027,960

UNITED STATES PATENT OFFICE 2,027,960

LANDING GEAR FOR AEROPLANES

William A. Crossley, Philadelphia, Pa.

Application August 15, 1934, Serial No. 739,907

8 Claims. (Cl. 244—2)

This invention relates to landing gear for aeroplanes and more particularly to landing gear comprising a combination of wheels and pontoons adapted for interchangeable use so that aeroplanes equipped with such apparatus may land at sea or on level ground.

The principal object of this invention is to provide landing gear of the type described which is of light weight and of simple construction, at the same time offering a minimum of resistance to flight through the air, and capable readily of conversion for use at sea or on land by mechanical operations which may be performed by the pilot while seated in the cockpit of the fuselage.

A more specific object of the invention is to provide landing wheels which are substantially housed within pontoons, and cover members which are normally held in positions not obstructing engagement of the landing wheels with the ground, but which are adapted to be moved to positions wherein they form with the pontoons housings completely surrounding the landing wheels.

Another object of the invention is to provide in combination with such apparatus means for operating the movable cover members, and preferably in addition means for operating a locking device to effect a fluid-tight seal between the cover members and pontoons when the landing wheels are housed, all of said operating means leading to the cockpit of the aeroplane so that they may be controlled by the pilot.

Another object of the invention is to provide in combination with forward wheels and pontoons adapted for interchangeable use, a combined rear wheel and pontoon, the rear pontoon being in the form of a revolvable cylinder and serving as a hub for the rear wheel as well as a means of propelling the aeroplane through the water.

Still other objects and advantages characterizing my invention will become more fully apparent from the description hereinafter set forth of one embodiment or example of the invention, the description having reference to the accompanying drawings, whereof:

Fig. I represents a side elevation of an aeroplane equipped with landing gear of my invention.

Fig. II represents a front elevation of the same.

Fig. III represents an enlarged cross section of the forward landing gear, taken as indicated by the lines III—III in Fig. I.

Fig. IV represents an additional cross section of the forward landing gear, taken as indicated by the lines IV—IV of Fig. II.

Fig. V represents in detail the apparatus employed for operating the movable cover members associated with the forward pontoons.

Fig. VI represents a longitudinal cross section at the bottom flange of a pontoon showing the locking devices employed for sealing the cover member when closed.

Fig. VII represents an enlarged cross section of the same, taken transversely of the pontoon.

Fig. VIII represents an enlarged cross section of the combined rear pontoon and landing wheel, taken as indicated by the lines VIII—VIII of Fig. IX, and showing the driving means for rotating the pontoon; and, Fig. IX represents an additional view of the rear pontoon partly in elevation and partly in cross section, taken as indicated by the lines IX—IX of Fig. VIII.

In the drawings, an example of my invention is shown as applied to a conventional form of aeroplane, the fuselage of which is indicated at 1, the cockpit at 2, and the pilot seat at 3. As the apparatus of this invention may be applied to many different types of aeroplanes, a detailed description of the particular plane selected for illustration is deemed unnecessary.

The forward end of the fuselage 1 is supported by struts 4 upon spaced pontoons 5 which substantially house a pair of landing wheels 6. Desirably the wheels 6 project downwardly from the pontoons 5, as shown most clearly in Figs. III and IV, a sufficient distance so that when uncovered the wheels are unobstructed for engagement with the ground. The particular form which the wheels 6 may take is relatively unimportant, but in the example selected for illustration each wheel comprises an annular disc 7 surrounding a hub portion 8 and a rubber tire 9 mounted in a conventional manner upon the disc 7.

As shown most clearly in Figs. I and II, the pontoons 5 are preferably hemi-spherical at their forward ends and are tapered gradually toward the rear. They may be constructed of aluminum or other light metal. Each pontoon 5 comprises an outer shell 12 and an inner shell 13. At each side of the inner shell 13, there is provided a roller bearing 14. The bearings 14 are engaged by trunnions 15 and 16 to which the hub portion 8 of the wheel 6 is demountably secured by bolts 17. In an obvious manner when the lower end of the inner shell 13 is uncovered, access may be had to the bolts 17, and by removing these bolts the hub portion 8 of the wheel may be released from the trunnions 15 and 16, thus permitting the wheel to be removed through the lower end of the inner shell 13.

At the lower end of each pontoon, 5, there is provided a movable cover member 20 which is supported by hinges 21 and which is of a shape substantially complementary to that of the inner shell 13, so that when closed it forms with the inner shell 13 a housing completely surrounding the wheel 6. Each cover member 20 has connected therewith a link 22 for swinging the same about its hinge 21. When the cover members 20 are in their raised positions, as illustrated in dotted lines in Fig. III, they do not obstruct the wheels 6 and permit the landing of the plane on the ground. On the other hand, when the cover members 20 are in their closed positions, they form a water-tight housing for the wheels, thus adapting the plane for landing in the sea. The cover members 20 are normally urged towards the closed positions by springs 19 disposed at the hinges 21.

The particular means for operating the cover members 20 may take a variety of forms, but in the illustrated example, as clearly shown in Fig. V, the links 22 are pivotally connected at 23, and through a flexible joint 24 join an internally threaded sleeve 25. An externally threaded screw 26 engages the sleeve 25. The screw 26 is rotated through bevel gearing 27 by means of a crank 28 which is disposed adjacent to the pilot seat 3, as shown most clearly in Fig. I. In an obvious manner rotation of the crank 28 imparts a rotary movement to the screw 26 which in turn raises or lowers the sleeve 25, causing the movable cover members 20 to be opened or closed as desired.

For the purpose of maintaining a fluid-tight seal between the cover member 20 and the inner shell 13 there is interposed between these members a gasket 31, and means are provided for mechanically locking the cover member 20 in tightly closed position. In the illustrated example of the invention, such means include a locking rod 32, which extends longitudinally in a casing 33 disposed outwardly of the bottom flange 34 of each pontoon 5. Each locking rod 32 has thereon a series of crank arms 35 which are adapted to actuate pins 36, in such manner as to force the flange 38 of the cover member 20 into tight fitting engagement with the adjacent flange 34 of the pontoon 5. The pins 36 have wedge-shaped ends which engage in slots 37 in the flanges 38 of the cover member 20. For actuating the locking rod 32 an operating rod 39 is provided, this rod being connected to a crank 41 on a shaft 40 which extends from one casing 33 to the other. The shaft 40 is at its ends connected by bevel gears 43 to each locking rod 32. An axial pull on the operating rod 39 will cause rotation of the shaft 40 and hence rotation of the locking rods 32. Rotation of the locking rods 32 in a clockwise direction, as viewed in Fig. VII, forces the pins 36 against the pressure of springs 44 into the slots 37. Rotation of the locking rods 32 in the opposite direction is assisted by the springs 44 and retracts the pins 36. In the cockpit 2 a lever 42 is placed near the seat 3 for raising and lowering the operating rod 39. In an obvious manner, by a forward or backward motion of the lever 42, the locking rods 32 may be operated at the will of the pilot.

As shown in Figs. III and IV, each wheel 6 may be provided with a brake 45 operable by the movement of a clevis 46 about a pivotal point 47. Connected to the clevis 46 is a brake rod 48 which passes through a bushing 49 in the pontoon 5 and joins a cable 50. The cables 50 of each pontoon pass around sheaves 51 and are connected to cranks 52 on a shaft 53. An operating rod 54 is connected to an additional crank 55 on the shaft 53. A lever 56 is situated in the cockpit 2 adjacent to the pilot seat 3 and is employed for actuating the brake mechanism.

At the rear of the aeroplane there are attached to the fuselage 1 depending struts 57 which support a pontoon 58 in the form of a revolvable cylinder. The pontoon 58 has at each end trunnions 59 engaging roller bearings 60 supported by the struts 57. Surrounding the central portion of cylindrical pontoon 58 is a wheel 61 having a pneumatic tire 62. The cylindrical pontoon 58 thus forms a hub for the wheel, permitting its free rotation while in engagement with the ground. Moreover, the tire 62 may be removed and replaced by removal of the bolts 80 followed by detachment of the bottom members 81 of the struts 57.

Desirably the cylindrical pontoon 58 is provided at each end portion with propelling devices, which may taken the form of notched formations 63 as represented most clearly in Fig. VIII, so that when the pontoon 58 is revolved about its longitudinal axis, the aeroplane may be propelled through the water. In the illustrated example, the pontoon 58 is manually driven by sprocket and chain mechanism leading to the cockpit 2 of the fuselage 1. More specifically, a sprocket wheel 64 is attached to an annular surface of the pontoon 58 and is connected by a chain 65 to an additional sprocket wheel 66 mounted on a shaft 68 extending between the struts 57. Connected with the sprocket wheels 66 there is an additional sprocket wheel 69 also mounted on the shaft 68. As shown most clearly in Fig. VIII, the sprocket wheel 69 is connected by a chain 71 with a sprocket wheel 72 mounted on a shaft 73 supported by bearings 74 within the fuselage 1. On the shaft 73 there is an additional sprocket 75 which is connected by a chain 76 with a sprocket wheel 77 situated in the cockpit 2. Preferably the sprocket wheel 77 has thereon a crank arm 78 which may be manipulated by the pilot while seated in the fuselage 1. In an obvious manner rotation of the sprocket wheel 77 imparts a rotary movement to the pontoon 58 and enables the aeroplane to be propelled manually through the water. Such mechanism is of particular benefit when an emergency landing is made at sea and when other means are not available for moving the aeroplane through the water.

It will be particularly noted that the landing gear of this invention may be attached to many different types of aircraft, and that it is of simple construction and of inexpensive manufacture. Moreover, by constructing the forward pontoons with a substantially circular cross section, tapering rearwardly in the manner shown, such pontoons are rendered light and offer a minimum of resistance to flight through the air. At the same time such pontoons are adequate to provide positive buoyancy for the aeroplane when a landing is made at sea with the cover members 20 in closed position.

While I have described one example of the practice of my invention in some detail, it will be apparent that many changes may be made in the form of apparatus herein described and illustrated without departing from the spirit of the invention, and that certain features of the invention may be used at times to advantage without a corresponding use of other features.

Having thus described my invention, I claim:

1. In an aeroplane, a fuselage, landing gear comprising a wheel, a pontoon attached to the fuselage and housing the upper portion of said wheel, and a cover member adapted to be held in a position not obstructing engagement of the lower portion of the wheel projecting beneath the pontoon with the ground, said cover member being movable to a position wherein it covers the projecting portion of said wheel and forms with said pontoon a fluid-tight housing completely surrounding said wheel.

2. In an aeroplane, a fuselage, landing gear comprising spaced wheels, similarly spaced pontoons attached to the fuselage and housing the upper portions of said wheels, and cover members adapted to be held in positions not obstructing engagement of the lower portions of the wheels projecting beneath the pontoons with the ground, said cover members being movable simultaneously to positions wherein they cover the projecting portions of said wheels and form with said pontoons fluid-tight housings completely surrounding said wheels.

3. In an aeroplane, the combination with the fuselage of landing gear comprising wheels, pontoons attached to the fuselage and housing the upper portions of said wheels, cover members movable from positions not obstructing engagement of the lower portions of the wheels projecting beneath the pontoons with the ground to positions wherein they cover the projecting portions of said wheels and form with said pontoons fluid-tight housings completely surrounding said wheels, and means for operating said cover members from the fuselage.

4. In an aeroplane, the combination with the fuselage, of landing gear comprising wheels, pontoons attached to the fuselage and housing the upper portions of said wheels, cover members movable from positions not obstructing engagement of the lower portions of the wheels projecting beneath the pontoons with the ground to positions wherein they cover the projecting portions of said wheels and form with said pontoons fluid-tight housings completely surrounding said wheels, means for sealing the edges of said cover members in fluid-tight contact with said pontoons, and means for operating said cover members and sealing means from the fuselage.

5. In an aeroplane, a fuselage, landing gear comprising a wheel, a pontoon of substantially circular cross section attached to the fuselage and housing the major portion of said wheel but permitting engagement of the projecting rim thereof with the ground, and a cover member hinged to said pontoon, said cover member being movable from a position not obstructing engagement of the wheel with the ground to a position wherein it covers the projecting portion of said wheel and forms with said pontoon a fluid-tight housing completely surrounding said wheel.

6. In an aeroplane, a fuselage, landing gear comprising spaced wheels, pontoons attached to the fuselage and housing the major portions of said wheels but permitting engagement of the projecting rims thereof with the ground, cover members hinged to said pontoons, and an operating rod having connections to said cover members for moving them simultaneously from positions not obstructing engagement of the wheels with the ground to positions wherein they cover the projecting portions of said wheels and form with said pontoons fluid-tight housings completely surrounding said wheels.

7. In an aeroplane, a fuselage, landing gear comprising a pontoon attached to the fuselage and having an inner and outer shell a wheel substantially housed within said inner shell and demountably secured thereto, said wheel projecting beneath the pontoon for engagement with the ground and said inner shell being open at its lower end to render access to the securing means and to permit the removal of the wheel, and a cover member for covering the projecting portion of the wheel, said cover member being hinged to the open end of said inner shell and adapted to form therewith a fluid-tight housing completely surrounding the wheel.

8. In an aeroplane, a fuselage, a three point landing gear comprising spaced wheels at the forward end of the fuselage, similarly spaced pontoons housing the upper portions of said wheels, cover members adapted to be held in positions not obstructing engagement of the lower portions of the wheels projecting beneath the pontoons with the ground, said cover members being movable to positions wherein they cover the projecting portions of said wheels and form with said pontoons fluid-tight housings completely surrounding said wheels, and a combined wheel and pontoon at the rear end of the fuselage.

WILLIAM A. CROSSLEY.